(12) United States Patent
Sagna

(10) Patent No.: US 12,722,565 B2
(45) Date of Patent: Sep. 1, 2026

(54) VEHICLE STEERING WHEEL LIGHTING DEVICE HAVING A COMPACT DESIGN AND LIGHT GUIDE

(71) Applicant: Autoliv Development AB, Vargarda (SE)

(72) Inventor: Boubacar Sagna, Paris (FR)

(73) Assignee: Autoliv Development AB, Vårgårda (SE)

(*) Notice: Subject to any disclaimer, the term of this patent is extended or adjusted under 35 U.S.C. 154(b) by 9 days.

(21) Appl. No.: 18/730,616

(22) PCT Filed: Feb. 7, 2022

(86) PCT No.: PCT/EP2022/052858
§ 371 (c)(1),
(2) Date: Jul. 19, 2024

(87) PCT Pub. No.: WO2023/147880
PCT Pub. Date: Aug. 10, 2023

(65) Prior Publication Data

US 2025/0083596 A1 Mar. 13, 2025

(51) Int. Cl.
*B60Q 3/283* (2017.01)
*B60K 35/60* (2024.01)
*B60Q 3/64* (2017.01)
*B60Q 3/78* (2017.01)

(52) U.S. Cl.
CPC .............. *B60Q 3/283* (2017.02); *B60K 35/60* (2024.01); *B60Q 3/64* (2017.02); *B60Q 3/78* (2017.02); *B60K 2360/332* (2024.01); *B60K 2360/336* (2024.01); *B60K 2360/338* (2024.01); *B60K 2360/782* (2024.01)

(58) Field of Classification Search
CPC . B60Q 3/283; B60Q 3/64; B60Q 3/78; B60K 35/60; B60K 2360/332; B60K 2360/336; B60K 2360/338; B60K 2360/782
USPC .......................................................... 348/837
See application file for complete search history.

(56) References Cited

U.S. PATENT DOCUMENTS 9,045,078 B2 * 6/2015 Tovar ..................... B62D 1/046
10,124,714 B2 * 11/2018 Reuschel ................. B60Q 1/26
11,560,094 B2 * 1/2023 Huizen ................ B60K 35/223
(Continued)

FOREIGN PATENT DOCUMENTS

DE 102018200591 A1 7/2019
EP 2937263 A2 10/2015
(Continued)

*Primary Examiner* — Matthew David Kim
(74) *Attorney, Agent, or Firm* — Matthew D. Thayne; Thayne and Davis LLC

(57) ABSTRACT

A light bar for a vehicle steering wheel, comprising: a plurality of light sources, such as LEDs, a diffuser arranged to diffuse light coming from the plurality of light sources towards an occupant of the vehicle, a light guide, which is arranged between the plurality of light sources and the diffuser and comprises a common exit surface and a plurality of optical portions each having an entry surface arranged facing each of the light sources, wherein the light guide further comprises a plurality of deflecting surfaces each arranged between each entry surface and the common exit surface so as to generate a change in a main direction of the light.

18 Claims, 7 Drawing Sheets

(56) References Cited

U.S. PATENT DOCUMENTS

| | | | | |
|---|---|---|---|---|
| 2006/0034092 | A1* | 2/2006 | Okazaki | B60Q 3/12 362/489 |
| 2008/0212334 | A1* | 9/2008 | Hickman | B60Q 1/326 362/500 |
| 2012/0147584 | A1* | 6/2012 | Wu | G06F 3/0202 362/23.16 |
| 2014/0328077 | A1* | 11/2014 | Tovar | B62D 1/046 362/511 |
| 2014/0347840 | A1* | 11/2014 | Lee | G02B 6/0038 362/19 |
| 2015/0077405 | A1* | 3/2015 | Frojdh | B60K 35/10 345/184 |
| 2015/0123947 | A1* | 5/2015 | Jubner | B60K 35/10 345/175 |
| 2016/0299681 | A1* | 10/2016 | Fröjdh | G06F 3/017 |
| 2016/0311366 | A1* | 10/2016 | Lisseman | B60Q 3/283 |
| 2018/0208111 | A1* | 7/2018 | Lisseman | B60K 35/20 |
| 2020/0340655 | A1* | 10/2020 | Diana | F21K 9/61 |
| 2023/0029371 | A1* | 1/2023 | Hatfield | B60R 21/215 |
| 2023/0143148 | A1* | 5/2023 | Muegge | F21S 43/245 362/509 |

FOREIGN PATENT DOCUMENTS

| | | | |
|---|---|---|---|
| FR | 3028476 | A1 | 5/2016 |
| FR | 3118920 | A1 | 7/2022 |
| WO | 2019/137699 | A1 | 7/2019 |

* cited by examiner

[Fig. 1]
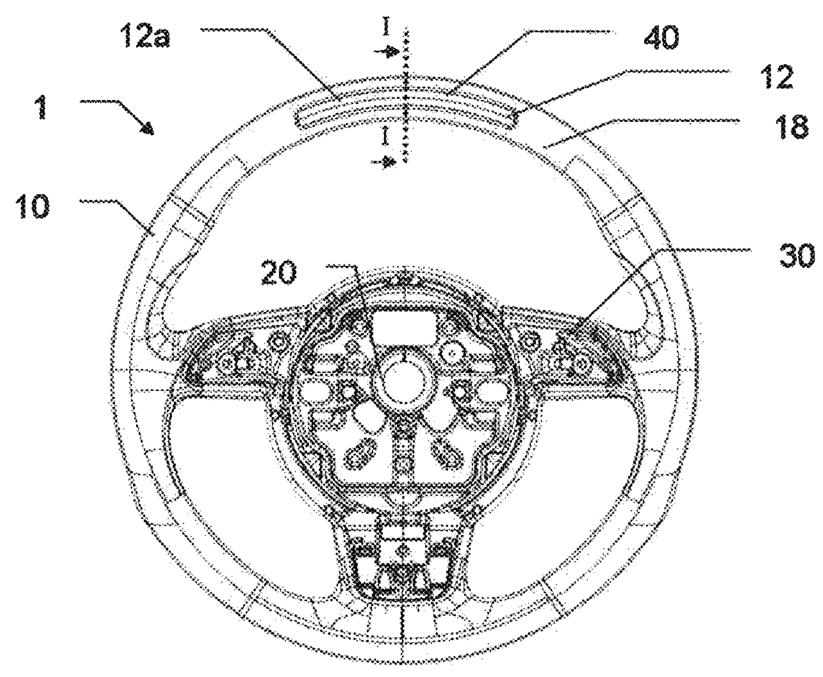
[Fig. 2]
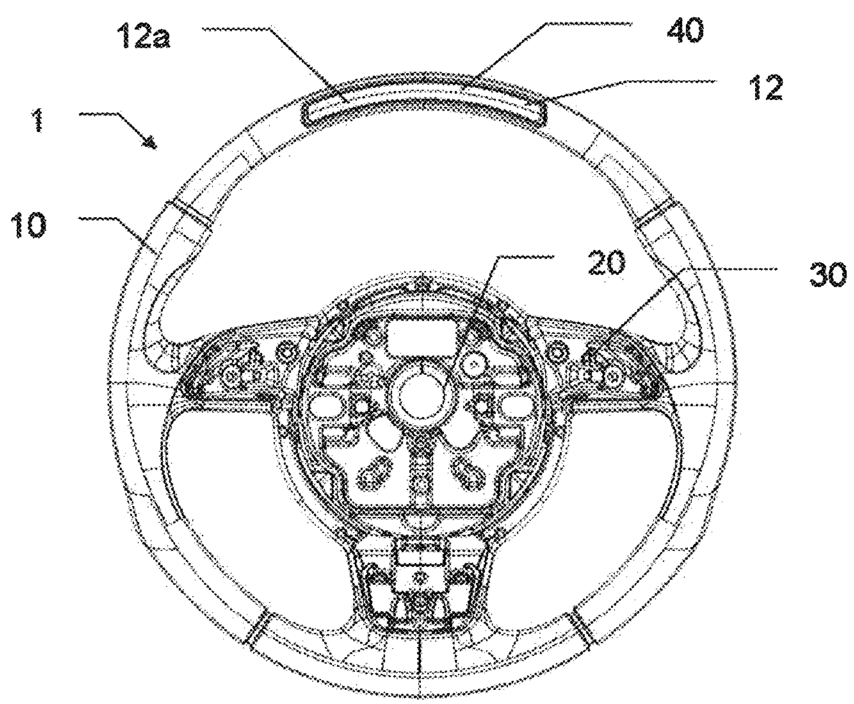

[Fig. 3]
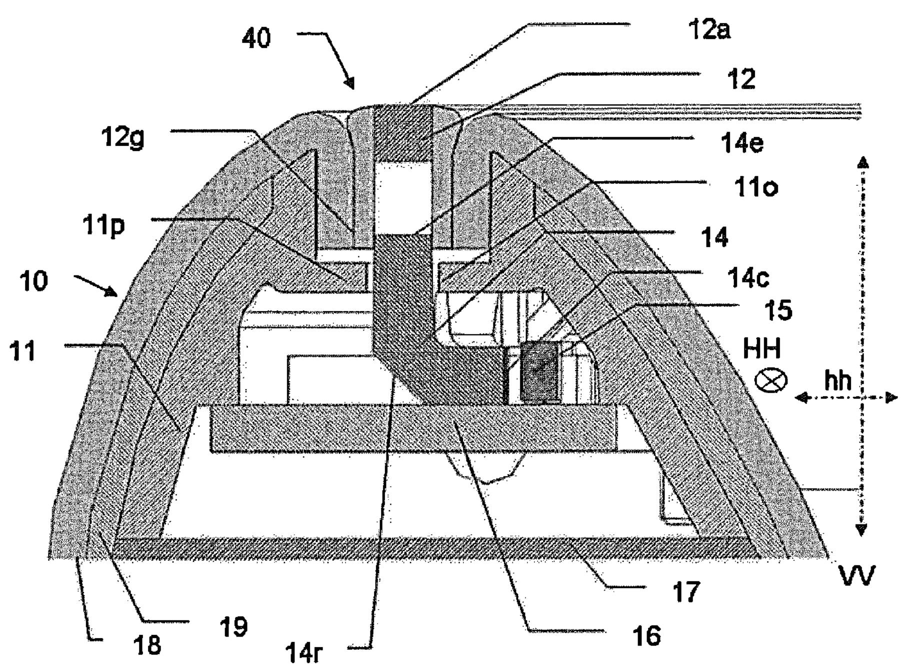
[Fig. 4]
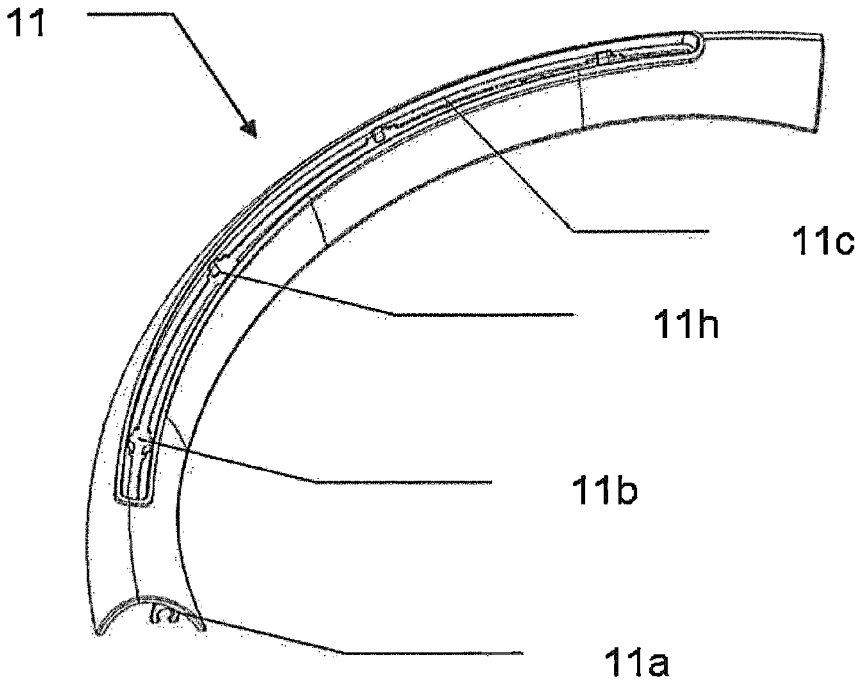

[Fig. 5]
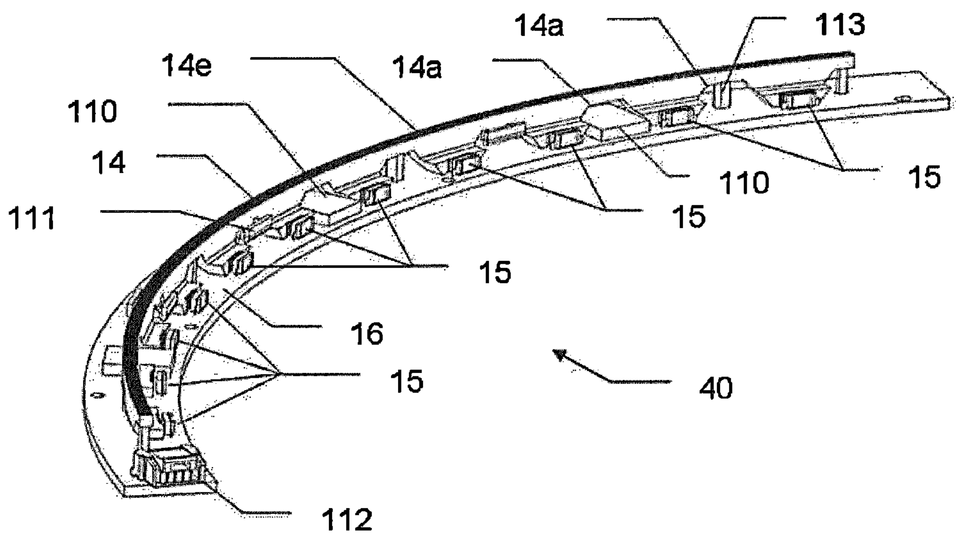
[Fig. 6]
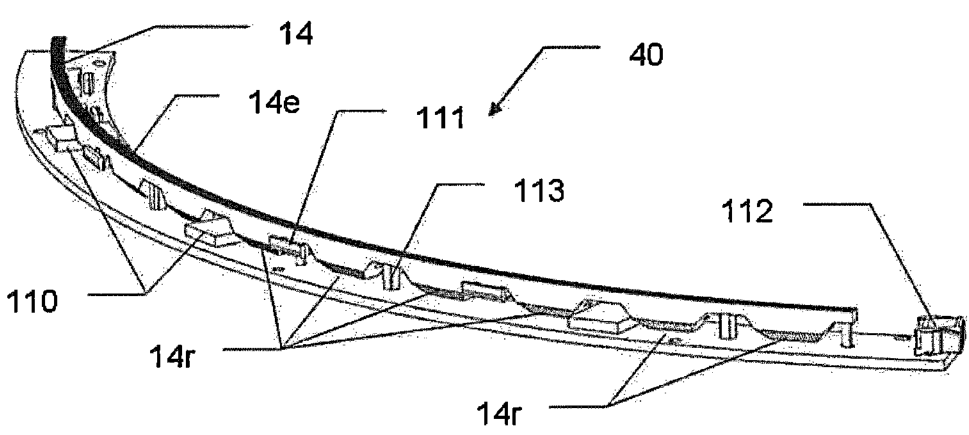

[Fig. 7]
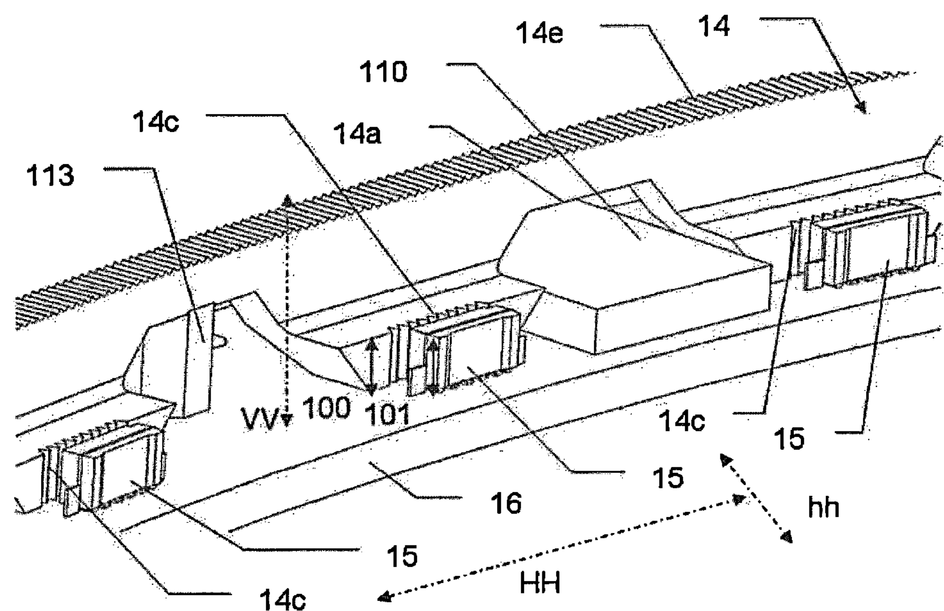
[Fig. 8]
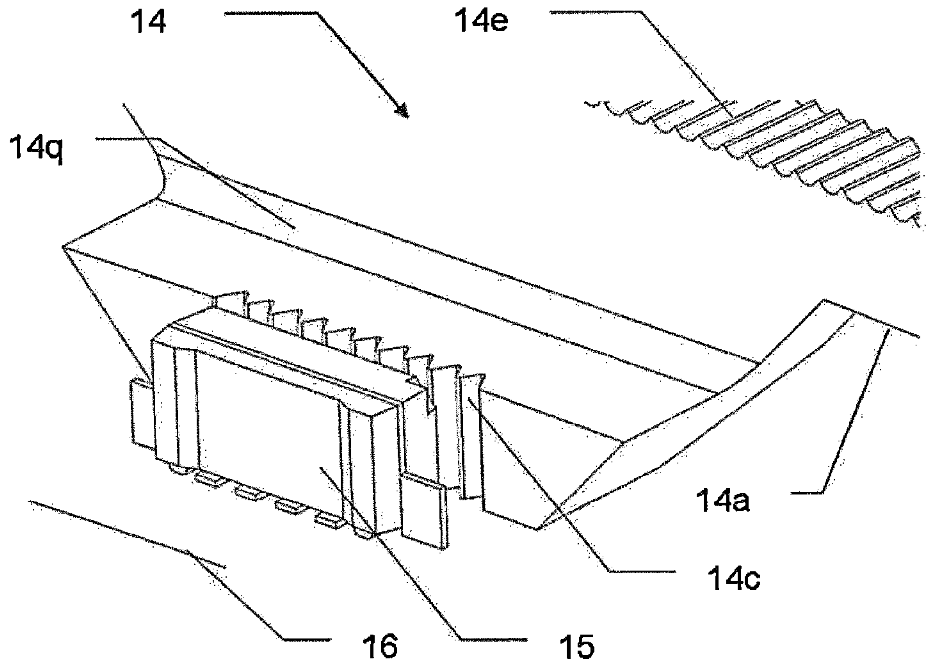

[Fig. 9]
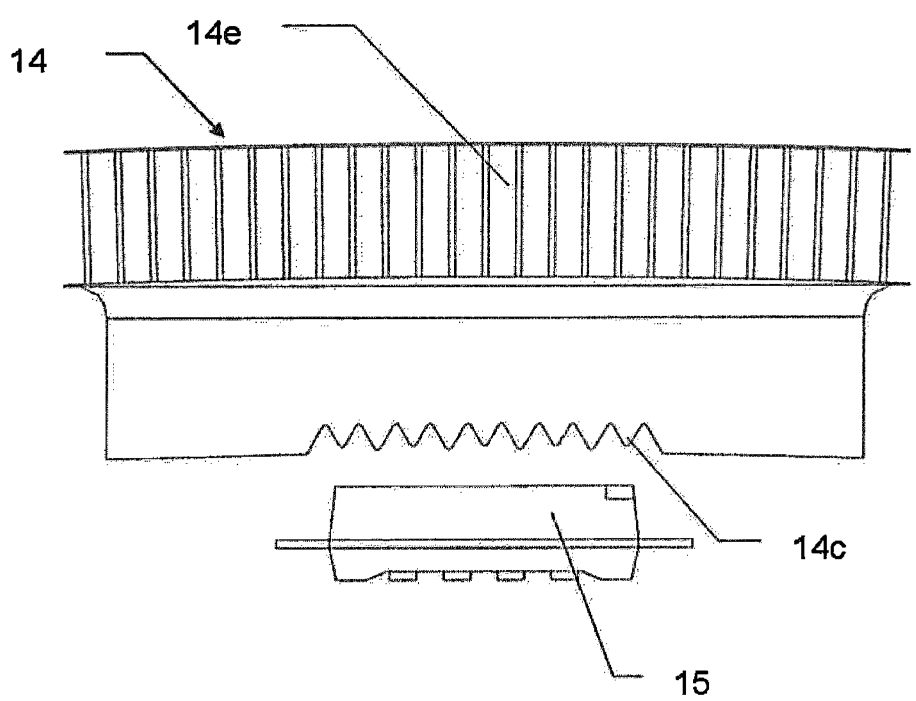
[Fig. 10]
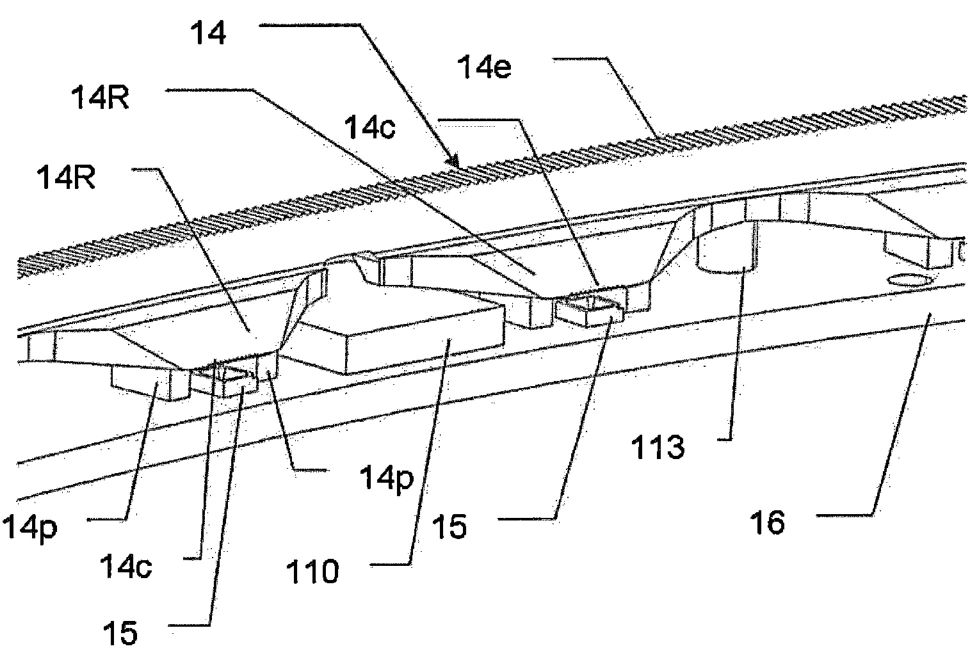

[Fig. 11]
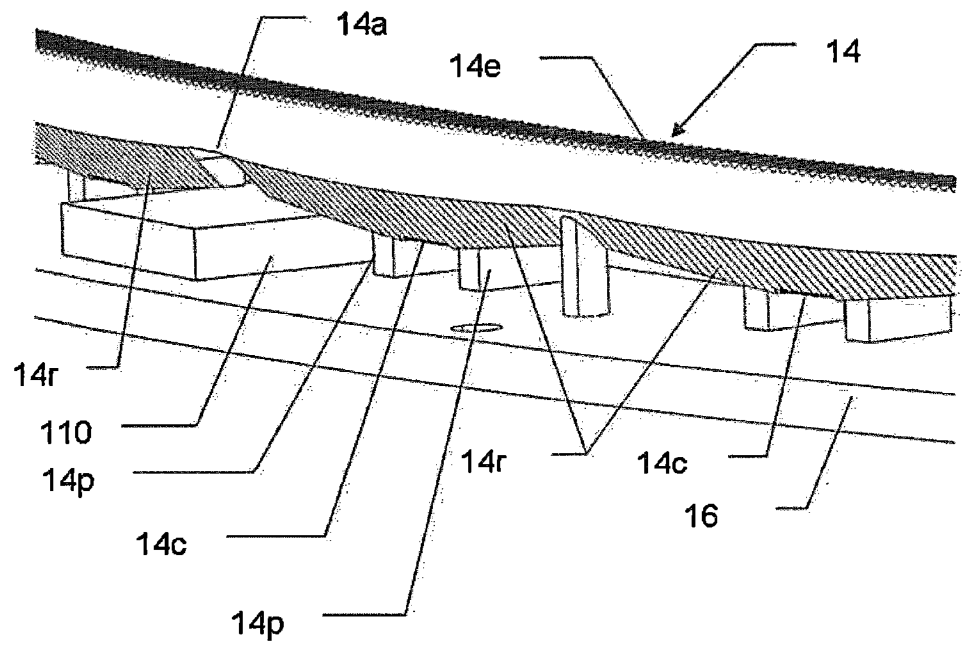
[Fig. 12]
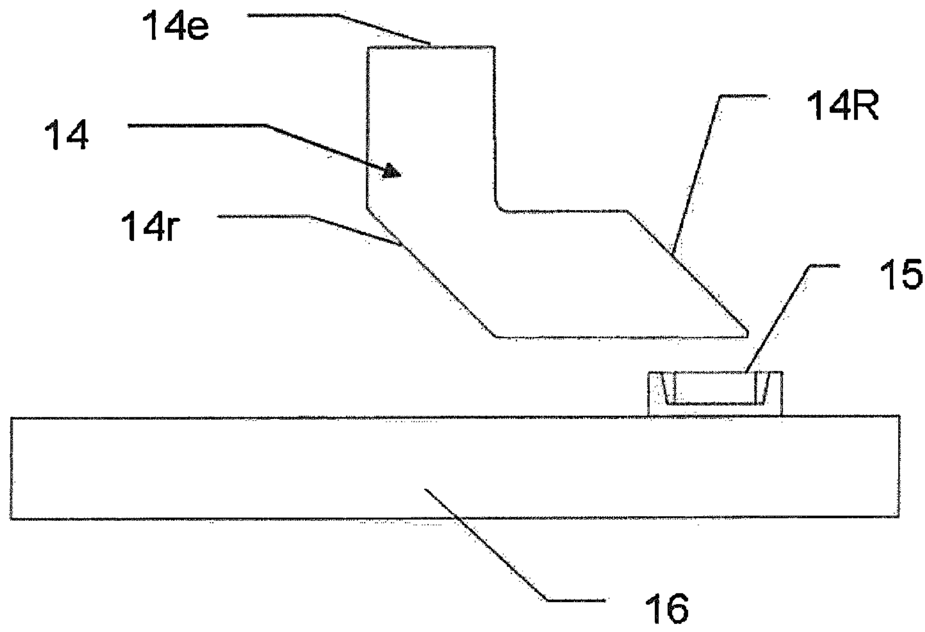

[Fig. 13]
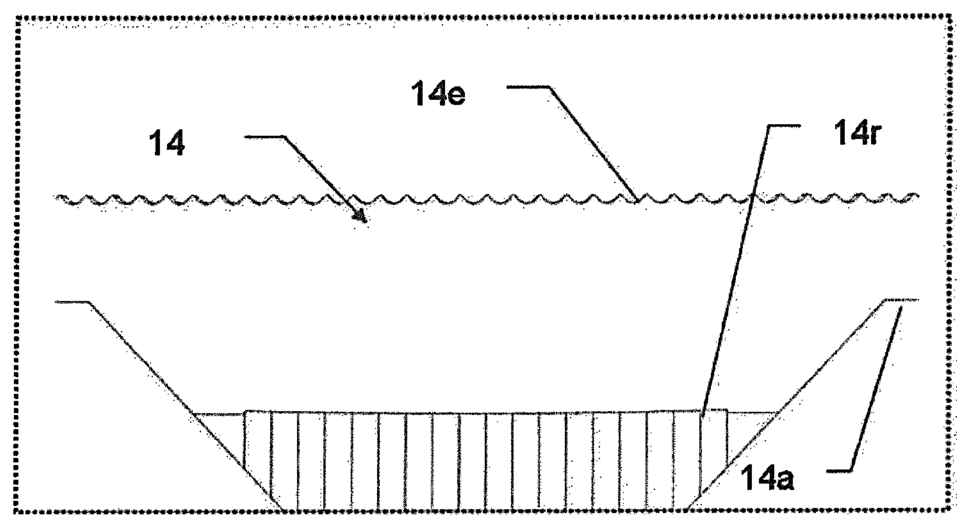
[Fig. 14]

VEHICLE STEERING WHEEL LIGHTING DEVICE HAVING A COMPACT DESIGN AND LIGHT GUIDE

TECHNICAL FIELD OF THE INVENTION

The present invention generally relates to a lighting device mounted in a steering wheel rim of a motor vehicle.

STATE OF THE ART

Lighting devices installed in a steering wheel rim are known in the prior art. Document WO2019/137699 discloses a steering wheel lighting device that is large in size and for which light can have hot spots and inhomogeneities.

DISCLOSURE OF THE INVENTION

One aim of the present invention is to address the disadvantages of the prior art mentioned above and in particular, first of all, to propose a lighting device for a steering wheel rim, which limits or eliminates the defects in appearance of the diffusion of light, while limiting the size of the device in order to integrate it into a steering wheel rim the dimensions of which are restricted and reduced.

To this end, a first aspect of the present invention relates to a light bar for a vehicle steering wheel, comprising:

- a plurality of light sources, such as LEDs,
- a diffuser arranged to diffuse light coming from the plurality of light sources towards an occupant of the vehicle,
- a light guide which is arranged between the plurality of light sources and the diffuser and comprising a common exit surface and a plurality of optical portions each having an entry surface arranged facing each of the light sources, characterized in that the light guide further comprises a plurality of deflecting surfaces each arranged between each entry surface and the common exit surface so as to generate a change in a main direction of the light.

The term "direction of light" is understood to mean the direction of the light relative to the light guide. A diffuser is understood to mean an optical element arranged to diffuse the light, that is to say that one of its surfaces is visible by the occupant or the end user, unlike a light guide which is arranged to transmit the light inside a device the surface of which is not visible by the end user.

The term "reorienting the light" means directing the light in a new main direction. In other words, the light has a first main direction at the exit of each of the plurality of light sources as well as at each entry surface of the light guide, and a second main direction at each deflecting surface on the side of the exit, at the exit surface of the light guide as well as at an entry face of the diffuser. The light is thus redirected between the entry surface and the exit surface. The reorientation of the light is to be distinguished from the dispersion of the light, for which the dispersed light no longer has any main direction. The reorientation of the light is to be distinguished from the dispersion of the light in that the main objective of the dispersion is to avoid light concentrations (typically hot spots) by dispersing the light in several directions. In other words, incoming light rays will be redirected in different ways in different directions. The main purpose of the reorientation of the light is to redirect the light, namely that incoming rays will be mostly, preferentially all, redirected in the same way (that is, the same transformation is applied to the majority, preferentially all, the incoming rays). In the literature, reference is made to folding the optical system, so that the optical path is longer than the size of the system itself.

A bar is understood to mean a long, narrow part, preferably curved along a curvature similar to that of the steering wheel, in order to be able to be integrated into the steering wheel, in particular the rim of the steering wheel.

This makes it possible to propose a compact light bar so as to respect the restricted space of the steering wheel rim (in particular its depth along an axis of rotation of the steering wheel) while improving the guiding and the diffusion of light to the user and by improving the light homogeneity. In addition, this makes it possible to propose a very thin light device of reduced size with high light uniformity criteria. An important feature to obtain a high degree of homogeneity is to have a longest possible light guiding length. Light animations and dynamic light effects of good quality are thus obtained, while having a uniform light mixture in a small mechanical size with an optimized number of light sources.

In other words, the invention relates to a light bar for a vehicle steering wheel, comprising:

- a plurality of light sources, such as LEDs,
- a diffuser arranged to diffuse light coming from the plurality of light sources towards an occupant of the vehicle,
- a light guide, which is arranged to guide the light coming from the plurality of light sources to the diffuser and comprising:
- a common exit surface arranged between the plurality of light sources and the diffuser,
- at least one entry surface arranged between the plurality of light sources and the common exit surface,
- characterized in that the light guide further comprises at least one deflecting surface, arranged between said at least one entry surface and the common exit surface, so as to generate a change in a main direction of the light.

Preferably, the common exit surface may be arranged facing the diffuser.

Preferably, at least one entry surface can be arranged so as to collect the light emitted by the light sources and/or arranged facing the light sources.

Preferably, a single common entry surface can be arranged so as to collect the light emitted by the light sources and/or arranged facing the light sources.

Advantageously, the diffuser may be arranged to form an outer surface of a steering wheel rim.

Advantageously, the light entering the diffuser may have a main direction of the light at the entry of the diffuser, and the light sources may have an offset relative to the diffuser in a direction perpendicular to the main direction of the light at the entry of the diffuser.

According to one embodiment, at least one light source of the plurality of light sources is arranged to emit visible light. According to one embodiment, each light source of the plurality of light sources is arranged to emit visible light. Light is considered to be visible if its wavelength is between 380 nm and 780 nm. In particular, the light bar according to the invention may not be provided for measuring devices or monitoring activity of a user who use light sources emitting invisible light (ultraviolet and/or infrared).

According to one embodiment, the light bar can be provided to send or display information to a user of the vehicle, in particular the driver.

According to one embodiment, the light guide may have an L-shaped cross-section.

According to one embodiment, the light guide may have a collecting surface arranged facing one or more light sources.

According to one embodiment, the collecting surface may have a collecting surface height that is greater than a height of the light source(s). This makes it possible to limit the unwanted light rays not collected by the light guide.

According to one embodiment, the collecting surface may be perpendicular to a main direction of the light emitted by the light source.

According to one embodiment, the collecting surface may have a collecting surface height less than 3 mm, and preferably less than 2.5 mm, in a direction normal to a direction of collection of the light, and/or in a direction tangential to the collecting surface, and/or along a direction of deflection of the light, and/or a direction of diffusion of the light.

According to one embodiment, the light guide may have a deflecting surface inclined relative to the light collecting surface. According to one embodiment, the deflecting surface may be inclined at 45°±10° relative to the light collecting surface.

According to one embodiment, the deflecting surface may have a height equal to about ±10% the height of the light collecting surface. This implementation makes it possible to correctly redirect all the collected light.

According to one embodiment, in a direction normal to the light collecting surface, the deflecting surface may have a length at least equal to 95% of the height of the light collecting surface.

Advantageously, the diffuser has a main axis parallel to its arc of curvature and the light sources may have an offset relative to the diffuser in a direction perpendicular to the main axis of the diffuser.

Advantageously, the diffuser comprises a contact surface with the light guide and has a main axis perpendicular to the contact surface, and the light sources may have an offset relative to the diffuser in a direction perpendicular to the main axis of the diffuser.

Advantageously, the offset is greater than a thickness of the light guide.

This makes it possible to optimize the size of the light bar and to guarantee good homogeneity of the light thanks to the elongation of the optical path by folding.

Advantageously, the deflecting surfaces form a common deflecting surface.

Advantageously, the optical portions may each comprise another deflecting surface.

This makes it possible to optimize the size of the light bar and to guarantee good uniformity of the light and to adapt to any type of light sources, in particular lateral or upper emission light sources.

Advantageously, the light guide may further comprise dispersive patterns on at least one entry surface, the deflecting surface of the optical portions, or the common exit surface.

Advantageously, the dispersive patterns of the entry surface can be arranged facing the light sources.

Advantageously, the dispersive patterns of the common exit surface may cover the entire common exit surface.

Advantageously, the dispersive patterns of the deflecting surface may cover all of each deflecting surface.

Advantageously, the dispersive patterns of the deflecting surfaces may have a pattern depth comprised between 0.02 mm and 0.1 mm and a pattern period between 0.5 mm and 1 mm for the patterns of the deflecting surface; and a pattern depth of between 0.1 mm and 0.5 mm and a pattern period between 0.2 mm and 1 mm for the entry and exit surfaces.

This improves the diffusion of the light in a compact light bar, while limiting the hot spots of light and optimizing the light distribution. The dispersion of the light is carried out in an axis perpendicular to the direction of propagation of the light beam in the guide, so that the radiation of the light sources reaches (or impacts) the diffuser homogeneously. In other words, the function of the dispersive patterns is to break or randomize the direction of propagation of the light rays in the light guide. Consequently, the path of the various light rays is very heterogeneous and multidirectional in the light guide, so that the light arrives homogeneously on the emitting or "downstream" surface of the light guide. Even if the surface of the light bar is elongated, the user will not perceive the difference in emission, emissivity, or light power along the light bar.

Advantageously, the deflecting surface is inclined relative to the entry surface.

Advantageously, an angle between the entry surface and the deflecting surface may be 45 degrees +/−10 degrees, preferably +/−5 degrees.

This makes it possible to optimize the light characteristics of the light bar and improve its size and mechanical strength.

Advantageously, the light bar may further comprise arches arranged along the light bar between the optical portions, and preferably the light bar may further comprise at least one centering part, such as a centering hanger, in abutment against at least one of the arches, so as to support it. Preferably, the hanger has a counter-form to that of the arch it supports. The hanger may also have another shape able to support the arch.

Advantageously, the light bar may further comprise mounting feet.

Advantageously, the light bar may further comprise pins, preferably headed pins.

Heading is hot deformation (for example as for rivets) wherein the pins can be heated by ultrasound or by laser.

Advantageously, the pins may be arranged to connect the light guide to the printed circuit supporting the light sources.

This makes it possible to improve the positioning of the light guide relative to the light sources, which is important in order to obtain good homogeneity. The arches may more generally be openings.

Advantageously, at least one of the deflecting surfaces may have a general radius of curvature greater than a predetermined value, typically 150 mm.

Advantageously, the entry surface of at least one of the optical portions is perpendicular to a light emission direction of the plurality of light sources.

Advantageously, the entry surface of at least one of the optical portions is arranged to conceal a secondary light from the plurality of light sources directly toward the diffuser, so that no ray from the light sources can directly reach the diffuser. In other words, the entry surface of at least one of the optical portions is arranged so that no radiation from the plurality of light sources directly accesses the diffuser.

This makes it possible to improve the optical performance of the light bar while improving its compactness.

A second aspect of the present invention relates to a vehicle steering wheel comprising a light bar according to the first aspect.

This makes it possible to propose a vehicle steering wheel with a compact light bar so as to respect the restricted size of the steering wheel rim while improving the guiding and diffusion of light to the user and by improving the light homogeneity.

A third aspect of the present invention relates to a vehicle comprising a vehicle steering wheel according to the second aspect.

This makes it possible to propose a vehicle with a vehicle steering wheel having a compact light bar so as to respect the restricted size of the steering wheel rim while improving the guiding and diffusion of light to the user and by improving the light homogeneity.

DESCRIPTION OF THE FIGURES

Other features and advantages of the present invention will become more apparent upon reading the following detailed description of an embodiment of the invention, which is provided by way of example but in no manner limited thereto, and illustrated by the attached drawings, in which:

FIG. 1 shows a front view of a steering wheel comprising a lighting device in a rim;

FIG. 2 shows the front view of the steering wheel comprising the lighting device in the rim, wherein a leather covering is not shown;

FIG. 3 shows a cross-sectional view of the rim comprising the lighting device, along the cross-section I-I;

FIG. 4 shows a perspective view of a holding body of the lighting device;

FIG. 5 shows a perspective view of a part of the lighting device from a first side;

FIG. 6 shows a perspective view of the part of the lighting device from a side opposite the first side;

FIG. 7 shows a detail view in perspective of the part of the lighting device from the first side;

FIG. 8 shows another detail view in perspective of the part of the lighting device from the first side;

FIG. 9 shows another top detail view of the part of the lighting device;

FIG. 10 shows a detailed perspective view of the part of the lighting device according to a second embodiment from the first side;

FIG. 11 shows a detail view in perspective of the part of the lighting device according to the second embodiment from the side opposite the first side;

FIG. 12 shows a schematic sectional view of the part of the lighting device according to the second embodiment;

FIG. 13 shows another detail view in elevation of the lighting device according to the second embodiment from the side opposite the first side;

FIG. 14 shows a detail view of a profile of a dispersive pattern of the lighting device, adapted to the deflecting surface;

DETAILED DESCRIPTION OF EMBODIMENT(S)

FIG. 1 shows a front view of a steering wheel comprising a lighting device in a rim;

FIG. 1 shows a front view of a steering wheel 1 comprising a lighting device 40 (or light bar 40) in a rim 10.

FIG. 1 thus shows the vehicle steering wheel 1 that typically comprises a rim 10 connected to a hub 20 by several arms 30. The rim 10 is equipped in the upper position, also known as the "12 o'clock" position, with a lighting device 40 (or light bar 40). This lighting device 40 has an external display wall 12*a* of a diffuser 12 that extends along the rim 10 over an angular sector of about 60° to 80°, but it is possible to provide a greater or lesser angular extent, up to 180° or even more for example, or even less than 60°. The steering wheel rim further comprises a covering such as leather (or artificial leather or other). The term "diffuser 12" is understood to mean the part visible to the occupant of the vehicle, which transmits the light, this part being able to be wholly or partially diffusive by the use of two materials, one of which is diffusing. It is thus possible to provide the diffuser 12 as a screen, one part of which is diffusive.

A cross-section I-I of the rim 10 is provided in order to show a cross-sectional view of the rim along I-I in FIG. 3.

FIG. 2 shows the front view of the steering wheel 1 comprising the lighting device 40 in a rim 10, wherein the covering 18 of the steering wheel 1 is not shown.

Reference numbers are preserved as much as possible and as necessary from one figure to another and from one embodiment to another.

FIG. 3 shows a cross-sectional view of the rim 10 comprising the lighting device 40, along the section I-I.

The lighting device 40 comprises a holding body 11 with an internal wall 11*p* and at least one opening 110.

The lighting device 40 further comprises at least one light source 15 arranged to emit light, such as a plurality of light sources (for example LEDs). The lighting device 40 also comprises the diffuser 12 (or light diffuser 12) arranged to diffuse light coming from the light sources 15 towards an occupant of the vehicle. In other words, the diffuser 12 diffuses the light towards the user, that is, its external surface or external display wall 12*a* is the surface directly visible by the user.

The lighting device 40 (or light bar 40) further comprises a light guide 14 arranged to guide the light emitted by the light sources 15 towards the diffuser 12. The light guide 14 is arranged between the light sources 15 and the diffuser 12.

The light guide 14 comprises a plurality of optical portions each comprising an entry surface 14*c* (also called light collecting face 14*c*) arranged facing each of the light sources 15. Thus, the light guide 14 comprises several light collecting faces 14*c* arranged on the side of the light sources 15 and a common light emitting face 14*e* on the side of the diffuser 12. The light guide 14 passes right through the opening 110 of the internal wall 11*p* of the holding body 11. More specifically, the collecting face 14*c* of the light guide 14 is arranged on a first side of the opening 110 and the emitting face 14*e* is arranged on a second side of the opening 110.

In other words, the light guide 14 comprises a transmission portion arranged between the collecting face 14*c* and the emitting face 14*e*, and arranged in the opening 110. The internal wall 11*p* is thus arranged between the light sources 15 and the diffuser 12.

The light guide 14 is engaged with the diffuser 12 in order to shape it to a predetermined size, although this is not essential. Indeed, the diffuser 12 is a thin part and in an arc of circle, and it can therefore twist or turn over, both in assembly and during use, which can damage or deform the other parts of the rim 10 or create defective points in the light diffusion, which is not only unsightly but also ineffective for correctly transmitting information to the user.

The light guide 14 and the diffuser 12 may each comprise a coupling portion arranged to fit together. That is, the light guide 14 and the diffuser 12 can be in contact, or the light guide 14 can support the diffuser 12, but also the light guide 14 can engage with the diffuser 12 to lock its movement. Reference is made to the light guide 14 acting as a centering pin in the light guide 12 which comprises a lateral guide wall 12*g*.

The diffuser 12 is thus an optical element arranged to diffuse the light; one of its surfaces (here the external display wall 12*a*) is visible by the end user, unlike a light guide arranged to transmit the light inside a device having no surface visible to the end user.

Furthermore, the light guide 14 comprises an exit surface common to the light coming from the plurality of light sources 15. The light guide 14 is thus arranged between the plurality the light sources 15 and the diffuser 12.

The optical portions of the light guide 14 each comprise a deflecting surface 14*r*. Thus, the light guide 14 comprises a plurality of deflecting surfaces 14*r*, each arranged between each collecting surface 14*c* (also called entry surface 14*c*) and each emitting surface 14*e* (also called exit surface 14*e*), so as to generate a change in a main direction of the light. This is particularly useful for using the maximum amount of space available in the section of the rim 10 as shown in this FIG. 3. Without this deflection, in order to maintain the same homogeneity of light with a light guide without deflection, the light sources would have to be positioned lower in the rim.

This makes it possible to propose a very thin lighting device 40, in a reduced size since the space available in the rim 10 is very small, which also offers very high luminous homogeneity criteria. In particular, an important characteristic in order to obtain a significant homogeneity is to have a significant light guiding length. The problem consisting in obtaining light animations and dynamic light effects of good quality, with light sources, while having a homogeneous light mixture in a small mechanical size with a reduced possible number of light sources, is thus solved.

The deflecting surface 14*r* is preferably inclined at 45 degrees +/−5 degrees relative to the light collecting surface 14*c*. The light collecting surface 14*c* (also called entry surface 14*c*) is preferentially perpendicular to the light-emitting surface 14*e* (also called exit surface 14*e*).

The light device 40 (or light bar 40) comprises a printed circuit 16 which has a main plane, passing through the axes HH and hh, and perpendicular to the axis VV. The emitting surface 14*e* is preferably parallel to the plane HH-hh and the light collecting surface 14*c* is preferably parallel to the axis VV. The deflecting surface 14*r* is preferably inclined at 45 degrees +/−5 degrees relative to the axis VV.

The embodiment of the light guide 14 with a single deflecting surface 14*r* is particularly suitable for lateral emission light sources 15.

The lighting device 40 further comprises a printed circuit board 16 (PCB) connected to the light source 15 and controlling it.

The steering wheel rim 10 further comprises a covering 18 such as leather (or artificial leather or other) and foam 17.

The rim 10 further comprises an electronic device 19 sheathed and under the covering 18, such as a presence sensor (capacitive, resistive or other) and/or a heating element, although the latter is not essential.

For example, the width of the printed circuit 16 in the plane HH-hh is 14 mm in a particular embodiment, and the height between the lower face of the printed circuit 16 and the external display wall 12*a* is 12 mm. Considering the reduced size of the rim 10, it is advantageous to have a light device 40 as compact as possible.

FIG. 4 shows a perspective view of the holding body 11 of the lighting device 40.

The holding body 11 is provided with attachment portions 11*a* on the bottom (or on its inner face), so as to allow the guiding of a power cable, not shown, although this is not essential.

The holding body 11 is also provided with holes 11*b* to leave a passage for the clips 12*c* of the diffuser 12 when the latter is inserted from the top into the holding body 11, in order to attach them together. The diffuser 12, which is provided with clips can then engage with the protrusions 11*h* of the holding body 11.

The holding body 11 further comprises blanks 11*c* in order to support the covering 18.

FIG. 5 shows a perspective view of a part of the lighting device 40, from a first side, that is, from the side of the light sources 15, that is, from a center of the arc of circle formed by the light guide 14.

The light-emitting face 14*e* (also called the exit surface 14*e*) of the light guide 14 is the common surface guiding the light from the plurality of light sources 15.

The light guide 14 comprises openings 14*a* such as arches 14*a* in order to house for example one or more microcontrollers 110 of the lighting device 40. Positioning interfaces or headed pins 113 for centering and/or attaching the light guide 14 onto the printed circuit 16 are also provided. They can cooperate with the light guide 14 at the openings 14.

The lighting device 40 further comprises a connector 112 on the printed circuit 16 in order to connect it to the other components of the steering wheel 1.

The light guide 14 also comprises shaping protrusions 111 serving as a holding interface between the light guide 14 and the holding body 11, although these shapes are not essential.

FIG. 6 shows a perspective view of the part of the lighting device 40, from a side opposite the first side. In other words, it is the view opposite to that of FIG. 5.

The deflecting surfaces 14*r* of the light guide 14 are shown.

The deflecting surfaces 14*r*, the light collecting surfaces 14*c* and/or the light emitting surfaces 14*e* may comprise dispersive patterns, as can also be seen in other figures. Depending on whether they are present on the deflecting surfaces 14*r*, the light collecting surfaces 14*c* and/or the light emitting surfaces 14*e*, dispersive patterns may have identical or different shapes.

Preferentially, the dispersive patterns are present on the entry and exit surfaces so as to capture the maximum of emitted light and homogenize it.

These dispersive patterns "burst" the light so as to obtain a homogeneous rendering, and thus help to reduce hot spots. These patterns can be, at the entry, only opposite the light sources 15 but preferably cover the entire light-emitting surface 14*e*.

On the deflecting surfaces 14*r*, the dispersive patterns can cover the entire surface to avoid hot spots without affecting the luminance.

Preferably, the dispersive patterns (or striations) on the deflecting surfaces 14*r* are shallow in depth in order to maintain the total reflection and to avoid shadow phenomena and multiple reflections, and they have accentuated shapes, part of the rays being able to be returned to the light sources 15. The height of the dispersive patterns may be between 0.02 and 0.1 mm, with a period of between 0.5 and 1 mm.

FIG. 7 shows a detailed view in perspective of the part of the lighting device 40 (or light bar 40), from the first side.

The light sources 15 emit light towards the light collecting surfaces 14*c* (also called entry surface 14*c*) of the light guide 14. The light is redirected by the deflecting surfaces 14*r* toward the common surface 14*e*, emitter of light, which re-emits the light toward the diffuser 12.

The openings 14*a* of the light guide 14 (such as arches 14*a*) are provided in order to house the microcontrollers 110 of the lighting device 40 or other electronic components.

The positioning interfaces 113 are used to center and/or attach the light guide 14 on the printed circuit 16.

The light sources 15 emit light in a main direction parallel to the main plane "HH-hh" of the printed circuit 16. The deflecting surfaces 14*r* reorient the main direction of the light such that it is perpendicular to the main direction of the printed circuit 16. The main surface of the common light-emitting surface 14*e* is substantially parallel to the main surface of the printed circuit 16, even though can be provided with waves or any other dispersive pattern, although this is not essential.

Furthermore, it is possible to provide for the collecting surface 14*c* to have a collector surface height 100 greater than the height of the light source 101 so as to limit the parasitic light rays going directly from the light source 15 to the emitting surface 14*e* or to the diffuser 12.

Preferably, the collecting surface 14*c* is perpendicular to the main direction of the light emitted by the light source 15, so as to limit the light bursting in the direction of the axis VV. The axis VV is perpendicular to the axis HH. The printed circuit 16 has a main plane, passing through the HH and hh axes.

FIG. 8 shows another detail view in perspective of the part of the lighting device 40, from the first side.

The light source 15 faces the light collecting surface 14*c* of the light guide 14. The light source 15 emits light in the direction of the collecting surface 14*c* and the light is redirected toward the emitting surface 14*e* by virtue of the deflecting surface 14*r*.

The light guide 14 comprises a radius of curvature 14*q* on the side of the collecting face 14*c*, on the side opposite the deflecting surface 14*r*. The radius of curvature 14*q* is preferentially smaller than 2 mm, very preferentially smaller than 1 mm. This makes it possible to reduce the impact of the radius of curvature 14*q* on the path of the light when the light is redirected by the deflecting surface 14*r*.

In one embodiment, the dispersive patterns on the collecting surface 14*c* have the role of dispersing the hot spot(s) of the light source 15, by changing from the natural Lambertian distribution of the light sources 15 (in particular the LEDs), with the maximum at the center, to a more homogeneous distribution by deflecting the light outside the axis. Preferably, the design is a triangle, preferably with an angle relative to the main light axis between 2° and 45°. The tips of the triangles have a softened appearance by a radius of curvature between 0.05 and 0.1 mm. The rays at the tips of the triangles allow light to pass through the center. The width of the triangles is preferably less than 0.5 mm, so as to be smaller than an LED chip and better for bursting the light.

FIG. 9 shows another top detail view of the part of the light device 40 and of the light guide 14.

In one embodiment, the emitting surface 14*e*, common for the light of all the light sources 15, has dispersive patterns as follows. These patterns are used to further homogenize the light beam. Preferably, they are extruded arcs of circle. The patterns may be similar to those of the deflecting surface at 45°, but with a more pronounced curvature; the deflection can be made from 0.1 mm to 0.5 mm with a pitch of 0.5 mm. The width of 0.5 mm makes it possible to bring the secondary sources thus created closer together under the diffuser 12. A width less than 1 mm may be suitable. Below 0.2 mm, the cost of the tooling can quickly increase.

Furthermore, it is possible to characterize the diffusing materials as follows.

The level of diffusion of the materials can be measured by 2 features: The first feature is the haze, as mentioned by standard ASTM D1003. This is the percentage of light emitted at more than 2.5° from the normal direction. A clear material has a haze close to 0%, and the haze of a diffusion material is close to 100%. A haze of less than 30% is, for example, imposed for the optical materials of headlights in the United States of America (list called AMECA), even after aging by ultraviolet. The second feature is the half-power angle, that is the half-angle of diffusion. For incident light collimated on a sample of the material, it is the angle for which the intensity is at 50% of the maximum. The diffusing materials for the screens and the diffuser 12 preferably have a haze greater than 80% and a half-angle of diffusion greater than 15°, preferentially greater than 40°. The materials of the light guide 14 preferably have a haze of less than 30%, and a low half-angle of diffusion, preferably less than 5°.

FIG. 10 shows a detailed perspective view of the part of the lighting device 40 according to a second embodiment, from the first side.

In this embodiment, the light sources 15 are positioned to emit light towards the light collecting faces 14*c*. The main direction of the light is perpendicular to the main plane of the printed circuit 16 and is redirected by second deflecting surfaces 14R of the light guide 14. The second deflecting surfaces 14R (also called other deflecting surfaces 14R) direct the light towards the deflecting surfaces 14*r*, which redirect the light toward the common light emitting surface 14. Thus, the light is subject to several deflections. The lighting device 40 is thus particularly compact, which is critical for the installation of the lighting device 40 in the rim 10. Thus, the optical portions may each comprise a second deflecting surface 14R (or other deflecting surface 14R), such that the light guide 14 may comprise a plurality of second deflecting surfaces 14R.

The embodiment of the light guide 14 with two deflecting surfaces 14*r*, 14R is particularly suitable for upper emission light sources 15 (or emission on the top of the light source 15).

FIG. 11 shows a detail in perspective view of the part of the lighting device 40 according to the second embodiment, from the side opposite the first side. In other words, it is the view opposite to that of FIG. 10.

The light guide 14 comprises feet 14*p*, preferably two feet 14*p*, arranged around each light source 15, in order to support the light guide 14, but also to hinder the lateral parasitic light.

FIG. 12 shows a schematic sectional view of the part of the lighting device 40 according to the second embodiment.

The light source 15 is positioned on the printed circuit 16 and the main direction of the light is perpendicular to the main plane of the printed circuit 16. The second deflecting surface 14R (also called other deflecting surface 14R) redirects the light toward the deflecting surface 14*r*, which in turn redirects the light toward the light emitting face 14*e*.

FIG. 13 shows another detail view in elevation of the lighting device 40 according to the second embodiment, from the side opposite the first side.

The deflecting surface 14*r* of the light guide 14 is shown, as well as the opening 14*a*. The light-emitting surface 14*e* is also shown.

FIG. 14 shows a detail view of a dispersive pattern of the lighting device 40, adapted to the deflecting surface 14*r*, and generally applicable to all the embodiments.

In one embodiment, the dispersive patterns of the deflecting surfaces 14*r* make it possible to improve the homogeneity of the light as follows. The role of the dispersive patterns is to disperse the light rays around their main direction. This face acts in reflection, and therefore the angle of deviation is twice the angle of incidence. A deflection of less than 0.1 mm can be provided for a pitch of 0.5 mm. The dispersive pattern is an arc of circle. In addition, the radius must remain small in order to maintain the total reflection and prevent light from passing through the face. The width of the pattern is between 0.2 and 1 mm, and the face can be inclined preferably between 40° and 50°.

It is possible to combine all the embodiments, so long as this is not incompatible.

It will be understood that various modifications and/or improvements which are obvious for the person skilled in the art may be made to the different embodiments of the invention described in this present description without departing from the scope of the invention defined by the appended claims.

In particular, reference is made to adaptations in terms of enlarging or reducing the arc of the diffuser 12, to adjust the angle of the deflecting surfaces 14*r*, of the second deflecting surfaces 14R, or of the bevels. Reference is also made to the possibility of having several light-emitting surfaces instead of a common surface.

The invention claimed is:

1. A light bar for a vehicle steering wheel, comprising:

a plurality of light sources, a diffuser arranged to diffuse light coming from the plurality of light sources towards an occupant of the vehicle, and a light guide, which is arranged between the plurality of light sources and the diffuser, and comprises a common exit surface for the plurality of light sources and a plurality of optical portions each comprising an entry surface arranged facing each of the light sources, wherein the light guide further comprises a plurality of deflecting surfaces, each arranged between each entry surface and the common exit surface so as to generate a change in a main direction of the light.

2. The light bar according to claim 1, wherein the diffuser is arranged to form an outer surface of a steering wheel rim.

3. The light bar according to claim 1, wherein the light entering the diffuser has a main direction of the light at the entry of the diffuser, and wherein the light sources have an offset relative to the diffuser in a direction perpendicular to the main direction of the light at the entry of the diffuser.

4. The light bar according to claim 1, wherein the optical portions each comprise another deflecting surface.

5. The light bar according to claim 1, wherein the light guide further comprises dispersive patterns on at least one of the entry surface, the deflecting surface of the optical portions, or the common exit surface.

6. The light bar according to claim 5, wherein the light guide comprises dispersive patterns on the entry surface, and wherein the dispersive patterns of the entry surface are arranged facing the light sources.

7. The light bar according to claim 5, wherein the light guide comprises dispersive patterns on the common exit surface, and wherein the dispersive patterns of the common exit surface cover the entire common exit surface.

8. The light bar according to claim 5, wherein the light guide comprises dispersive patterns on the deflecting surface of the optical portions, and wherein the dispersive patterns of the deflecting surface cover all of each deflecting surface.

9. The light bar according to claim 5, wherein the light guide comprises dispersive patterns on the deflecting surface of the optical portions, and wherein the dispersive patterns of the deflection surfaces have a pattern depth of between 0.02 mm and 0.1 mm and a pattern period of between 0.5 mm and 1 mm.

10. The light bar according to claim 1, wherein an angle between the entry surface and the deflecting surface is 45 degrees, +/−10 degrees.

11. The light bar according to claim 1, further comprising arches arranged along the light bar between the optical portions.

12. The light bar according to claim 1, further comprising pins.

13. The light bar according to claim 1, wherein the entry surface of at least one of the optical portions is perpendicular to a light emission direction of the plurality of light sources.

14. The light bar according to claim 1, wherein the entry surface of at least one of the optical portions is arranged so that no radiation from the plurality of light sources directly accesses the diffuser.

15. The lighting device according to claim 1 in combination with a vehicle steering wheel.

16. A light bar for a vehicle steering wheel, comprising:

a plurality of light sources;

a diffuser arranged to diffuse light coming from the plurality of light sources towards a vehicle occupant; and a light guide positioned between the plurality of light sources and the diffuser, wherein the light guide comprises:

a common exit surface;

a plurality of optical portions, wherein each optical portion comprises an entry surface configured to face a light source of the plurality of light sources;

a plurality of deflecting surfaces, wherein each deflecting surface is positioned between an entry surface and the common exit surface so as to generate a change in a main direction of light; and one or more dispersive patterns formed on at least one of the plurality of deflecting surfaces.

17. The light bar of claim 16, wherein each of the one or more dispersive patterns is configured to modify light distribution while directing the light towards the common exit surface.

18. The light bar of claim 16, wherein each of the plurality of deflecting surfaces comprises a dispersive pattern formed thereon.

* * * * *